(12) United States Patent
Kadam et al.

(10) Patent No.: US 11,827,290 B2
(45) Date of Patent: Nov. 28, 2023

(54) ROTARY ASSIST APPARATUS FOR RECIRCULATING BALL STEERING GEARS

(71) Applicant: Ford Global Technologies, LLC, Dearborn, MI (US)

(72) Inventors: Rohit Kadam, Windsor (CA); Jennifer Laz, West Bloomfield, MI (US); Joseph Washnock, Canton, MI (US); Daniel Steven Payne, Southgate, MI (US); Christopher Colarusso, Southfield, MI (US); Maher Aboudaye, Dearborn Heights, MI (US); Marc-Etienne Leclerc, Dearborn Heights, MI (US); Jack E. Barry, Dearborn, MI (US); Tim P. Covert, Southfield, MI (US); Matthew Lee Brimmer, Ann Arbor, MI (US); James Philip Cooper, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 17/087,557

(22) Filed: Nov. 2, 2020

(65) Prior Publication Data
US 2022/0135118 A1 May 5, 2022

(51) Int. Cl.
*B62D 5/04* (2006.01)

(52) U.S. Cl.
CPC ......... *B62D 5/0448* (2013.01); *B62D 5/0409* (2013.01); *B62D 5/0454* (2013.01); *B62D 5/0481* (2013.01)

(58) Field of Classification Search
CPC .. B62D 5/0409; B62D 5/0412; B62D 5/0448; B62D 5/0454; B62D 5/0457;
(Continued)

(56) References Cited

U.S. PATENT DOCUMENTS

| 3,868,888 | A | * | 3/1975 | Rehfeld | .................. | B62D 5/24 |
| | | | | | | 91/375 A |
| 3,893,528 | A | * | 7/1975 | Rehfeld | .................. | B62D 5/06 |
| | | | | | | 180/6.3 |

(Continued)

FOREIGN PATENT DOCUMENTS

| CN | 203946160 | 11/2014 |
| CN | 107176203 | 9/2017 |

(Continued)

OTHER PUBLICATIONS

United States Patent and Trademark Office, "Non-Final Office Action," issued in connection with U.S. Appl. No. 17/192,703, dated Jul. 6, 2023, 9 pages.

(Continued)

*Primary Examiner* — Barry Gooden, Jr.
(74) *Attorney, Agent, or Firm* — HANLEY, FLIGHT & ZIMMERMAN, LLC; Lorne Forsythe

(57) ABSTRACT

Rotary assist apparatus for recirculating ball steering gears are disclosed. An example motor vehicle steering system includes an input shaft to couple to a steering shaft of a motor vehicle, a worm gear, a first end of the worm gear coupled to the input shaft, a second end of the worm gear fixed to a helical spur gear, a ball nut surrounding a portion of the worm gear, the ball nut including ball bearings and ball guides, an intermediate gear fixed to a first pinion, the first pinion engaged with the helical spur gear, a motor fixed to a second pinion, the second pinion engaged with the intermediate gear, the motor to rotate the worm gear to translate the ball nut, and a sector gear engaged with the ball nut, the sector gear to rotate as the ball nut translates.

20 Claims, 8 Drawing Sheets

(58) Field of Classification Search
CPC .... B62D 5/046; B62D 5/0463; B62D 5/0481; B62D 6/00; B62D 6/10; B62D 15/021
See application file for complete search history.

(56) References Cited

U.S. PATENT DOCUMENTS

| | | | | |
|---|---|---|---|---|
| 5,267,625 | A * | 12/1993 | Shimizu | B62D 5/0421 180/443 |
| 5,341,701 | A * | 8/1994 | Krom | B62D 3/08 74/499 |
| 5,482,131 | A * | 1/1996 | Cortes Guasch | B62D 5/24 91/380 |
| 6,810,985 | B1 | 11/2004 | Budaker et al. | |
| 8,360,197 | B2 * | 1/2013 | Escobedo | B62D 5/0454 180/407 |
| 8,567,554 | B2 * | 10/2013 | Zaloga | B62D 5/0421 180/446 |
| 9,346,490 | B2 * | 5/2016 | Washnock | B62D 5/24 |
| 9,975,573 | B2 * | 5/2018 | She | B62D 5/0484 |
| 10,421,481 | B2 * | 9/2019 | Wilske | B62D 5/0445 |
| 11,345,396 | B2 * | 5/2022 | Cartwright | B62D 1/20 |
| 2007/0083326 | A1 * | 4/2007 | Johnson | G01C 21/3484 701/420 |
| 2007/0089926 | A1 | 4/2007 | Jo et al. | |
| 2012/0241243 | A1 * | 9/2012 | Zaloga | B62D 3/08 180/444 |
| 2012/0241244 | A1 * | 9/2012 | Escobedo | B62D 5/0421 180/444 |
| 2013/0032430 | A1 * | 2/2013 | Zaloga | B62D 5/0421 180/444 |
| 2014/0157922 | A1 | 6/2014 | Schneider | |
| 2014/0311263 | A1 * | 10/2014 | Washnock | B62D 5/0421 74/89.14 |
| 2015/0101436 | A1 * | 4/2015 | Washnock | B62D 5/24 74/457 |
| 2018/0022381 | A1 * | 1/2018 | Matsumura | B62D 5/046 180/419 |
| 2018/0111643 | A1 * | 4/2018 | Kim | B62D 5/091 |
| 2018/0244305 | A1 * | 8/2018 | Cai | F16H 25/2214 |
| 2019/0351932 | A1 * | 11/2019 | Washnock | B62D 5/0454 |
| 2020/0017138 | A1 | 1/2020 | Kirchweger | |
| 2021/0038766 | A1 | 2/2021 | Chen et al. | |
| 2021/0261188 | A1 * | 8/2021 | Ko | B62D 3/08 |
| 2021/0387666 | A1 * | 12/2021 | Hultén | B62D 3/08 |
| 2021/0403077 | A1 | 12/2021 | Kogan | |
| 2022/0032991 | A1 * | 2/2022 | Pattok | B62D 5/0454 |
| 2022/0135118 | A1 | 5/2022 | Kadam et al. | |
| 2022/0169305 | A1 * | 6/2022 | Cartwright | B62D 5/0421 |
| 2022/0204072 | A1 * | 6/2022 | Boyle | B62D 5/0421 |
| 2022/0281516 | A1 * | 9/2022 | Washnock | B62D 3/08 |
| 2023/0271577 | A1 * | 8/2023 | Birsching | B60W 40/08 340/438 |

FOREIGN PATENT DOCUMENTS

| | | | |
|---|---|---|---|
| CN | 107140010 | 2/2019 | |
| CN | 209225235 | 8/2019 | |
| EP | 2450257 A1 | 5/2012 | |
| JP | 2004338553 | 12/2004 | |
| WO | WO-2020089208 A1 * | 5/2020 | ............... B62D 3/08 |

OTHER PUBLICATIONS

United States and Patent and Trademark Office, "Notice of Allowance and Fee(s) Due," issued in connection with U.S. Appl. No. 17/192,703, dated Aug. 30, 2023, 7 pages.

* cited by examiner

ROTARY ASSIST APPARATUS FOR RECIRCULATING BALL STEERING GEARS

FIELD OF THE DISCLOSURE

This disclosure relates generally to steering systems and, more particularly, to a rotary assist apparatus for recirculating ball steering gears.

BACKGROUND

Known vehicles typically include a mechanical linkage that connects front wheels of a vehicle to a steering wheel, which allows a driver to adjust the orientation of the front wheels by rotating the steering wheel. For example, many known steering systems include rack and pinion gears that translate rotational motion of a steering wheel to linear actuation or movement of a drag link and/or tie rods connected to the front wheels. As the steering wheel rotates, the drag link and/or the tie rods change the angular orientation of the wheels and steer the vehicle.

In recent years, trucks have utilized hydraulic assist recirculating ball (RCB) steering systems. The hydraulic assist of the RCB steering systems is provided by a pump that transports hydraulic steering fluid to the RCB system. In some implementations, electronic torque overlay mechanisms are utilized to provide an electric steering feel to the hydraulic system.

SUMMARY

An example rotary assist apparatus for recirculating ball steering gears is disclosed herein. An example motor vehicle steering system includes an input shaft to couple to a steering shaft of a motor vehicle. A worm gear has a first end coupled to the input shaft and a second end fixed to a helical spur gear. A ball nut surrounds a portion of the worm gear. The ball nut further includes ball bearings and ball guides. An intermediate gear is fixed to a first pinion that is engaged with the helical spur gear. A motor is fixed to a second pinion that is engaged with the intermediate gear. The motor is to rotate the worm gear to translate the ball nut.

An example steering actuator disclosed herein includes a worm gear fixed to a helical spur gear. The steering actuator further includes a first gear set, a second gear set, and a third gear set. The first gear set includes a pinion of a motor engaged with an intermediate gear. The second gear set includes a pinion of the intermediate gear engaged with the helical spur gear. The third gear set includes a ball nut engaged with a portion of the worm gear. The ball nut is to translate as the worm gear rotates.

An example steering apparatus disclosed herein includes a worm gear that is fixed to a helical spur gear. The worm gear and the helical spur gear are aligned along a first axis of rotation. An intermediate gear is fixed to a first pinion that is engaged with the helical spur gear. The intermediate gear and the first pinion are aligned along a second axis of rotation. A motor is fixed to a second pinion that is engaged with the intermediate gear. The motor and the second pinion are aligned along a third axis of rotation parallel to the second axis of rotation.

Figure 1:
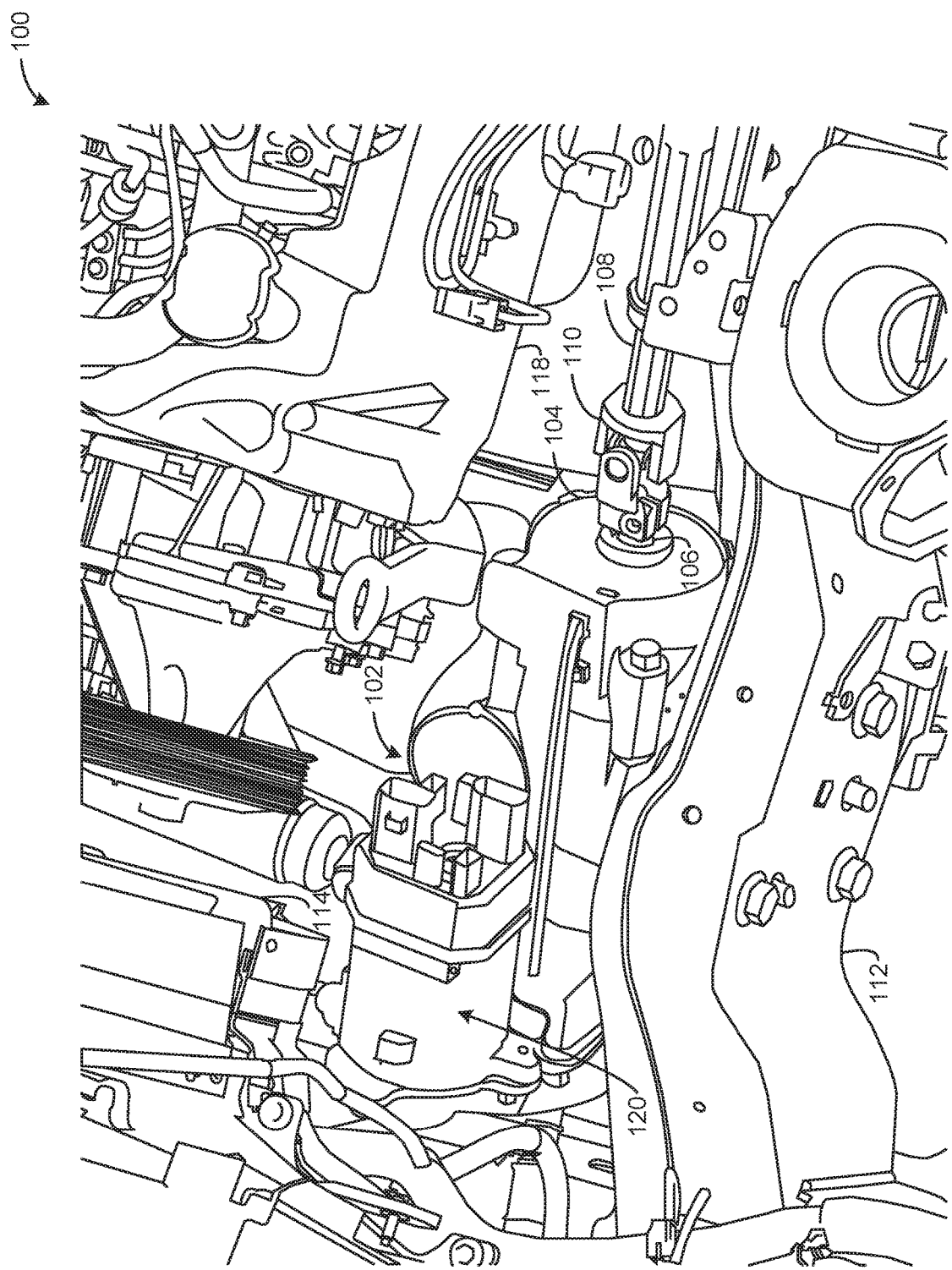
FIG. 1 illustrates a first view of a steering system in an under-hood environment of a vehicle.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example electrically powered rotary assist mechanisms for recirculating ball (RCB) steering gear systems. Traditionally, some heavy-duty trucks have utilized a steering mechanism including hydraulically assisted RCB gears or worm and wheel steering gears. In some instances, a pump provides the hydraulic assist to the RCB gears by pumping hydraulic steering fluid through the steering system. In some such instances, as the steering wheel is turned, a steering shaft rotates to cause a piston of the RCB gears to move linearly. In turn, the piston rotates a sector that is coupled to a pitman arm that turns the wheels. The hydraulic steering fluid is pumped to assist the movement of the piston based on the rotation of the steering shaft. However, hydraulic assist RCB gears lack precision in steering feel compared to electrically powered steering. Further, continuous pumping of a hydraulic pump causes a parasitic engine power loss and, thus, reduces an efficiency of the engine.

Known electrically powered steering systems utilize an electrically powered motor instead of the hydraulic pump and the associated piston to move a ball nut. However, the electrically powered steering systems often lack power compared to the hydraulic assist steering. As such, heavier vehicles, such as trucks and/or buses, typically utilize hydraulic assist steering.

Examples disclosed herein provide rotary assist apparatus for RCB steering gears. The example rotary assist apparatus generate sufficient power for relatively heavy vehicles such as trucks to utilize electrically powered steering systems. Although the rotary assist apparatus for RCB steering systems generate enough power to steer trucks, it should be understood that examples disclosed herein may be implemented in any other steerable vehicle. An example steering system (e.g., a steering actuator) disclosed herein includes an input shaft coupled to a steering shaft of a motor vehicle. In some examples, a driver rotates the input shaft by turning a steering wheel operatively coupled to the steering shaft. In some examples, the input shaft is coupled to a first end of a worm gear while a second end of the worm gear is fixed to a helical spur gear. In some such examples, the worm gear and the helical spur gear are aligned along a first axis of rotation. In some examples, an intermediate gear is fixed to a first pinion engaged with the helical spur gear. In some such examples, the intermediate gear and the first pinion are aligned along a second axis of rotation.

The steering system further includes a ball nut surrounding a portion of the worm gear. The ball nut includes ball bearings and ball guides to convert a rotation of the worm gear into a translation of the ball nut. In some examples, a sector gear, that is engaged with the ball nut, rotates as the ball nut translates. In some examples, a motor is fixed to a second pinion that is engaged with the intermediate gear. In some such examples, the motor and the second pinion are aligned along a third axis of rotation.

In some examples, a placement of the second axis of rotation and the third axis of rotation is orbital relative to the first axis of rotation. Specifically, the intermediate gear, the first pinion, the motor, and the second pinion can be positioned anywhere along a 360° orbit of the worm gear given that the first pinion is engaged with the helical spur gear and the second pinion is engaged with the intermediate gear.

In some examples, the second pinion rotates the intermediate gear and the associated first pinion. Further, the first pinion rotates the helical spur gear and, thus, the worm gear. As such, the rotation of the worm gear causes the ball nut to translate, which rotates the sector gear. In some examples, a first end of a pitman arm is coupled to the sector gear and a second end of the pitman arm is operatively coupled to a drag link and, in turn, one or more tie rods. As a result, the pitman arm converts the rotation of the sector gear to a movement of the drag link and the tie rod(s) to turn wheels of the motor vehicle. For example, the drag link and/or the tie rods are coupled to knuckles of the front wheels allowing the drag link and/or the tie rods to adjust the orientation of the front wheels as the pitman arm is moved by the sector gear.

In some examples, a first end of a torsion bar is coupled to an interior of the input shaft and a second end of the torsion bar is coupled to an interior of the worm gear. In some examples, a torque sensor measures an angular rotation of the input shaft relative to the worm gear via a magnet mounted on the input shaft and/or the torsion bar. Further, the torque sensor converts the angular rotation to a torque applied by the input shaft to the torsion bar. In turn, an output of the motor is based on the torque applied by the input shaft to the torsion bar and/or the angular rotation of the magnet.

In some examples, an engagement between the second pinion and the intermediate gear provides a first gear reduction. Additionally, an engagement between the first pinion and the helical spur gear provides a second gear reduction. As a result, the first gear reduction and the second gear reduction provide a combined reduction of greater than 100:1. Although examples disclosed herein may provide a gear reduction of greater than 100:1, the gear reduction may range anywhere from 1:1 to greater than 100:1.

In some examples, a first gear set includes the pinion of the motor engaged with the intermediate gear along a first plane. In some examples, a second gear set includes the pinion of the intermediate gear engaged with the helical spur gear along a second plane. Further, the pinion of the intermediate gear can be positioned anywhere within the second plane provided that the pinion of the intermediate gear is engaged with the helical spur gear and the intermediate gear is engaged with the pinion of the motor. In some examples, a third gear set includes the ball nut engaged with a portion of the worm gear. In some examples, the first plane and the second plane are orthogonal to an axis of rotation of the worm gear (e.g., the first axis of rotation). In some examples, the first plane does not intersect the worm gear.

FIG. 1 illustrates a first view of a motor vehicle steering system (e.g., a steering apparatus, a steering actuator) 102 in an under-hood environment 100 of a vehicle. In FIG. 1, the steering system 102 is positioned within a housing 104. In some examples, the housing 104 includes one or more housings that are coupled to protect the steering system 102, as discussed further in association with FIG. 3. In some examples, an input shaft 106 of the steering system 102 protrudes from the housing 104. In some examples, the input shaft 106 couples to a steering shaft 108 via a connection 110. In some examples, the steering shaft 108 is operatively coupled to a steering wheel of the vehicle. As a result, the input shaft 106 rotates with the steering shaft 108 as a driver rotates the steering wheel. In turn, the steering system 102 converts the rotation of the steering wheel to a rotation of the wheels of the vehicle to steer the vehicle.

In FIG. 1, the steering system 102 is positioned in the under-hood environment between a frame 112 and a fan 114 of the vehicle. Typically, vehicles include the fan 114 to pass air through a radiator and maintain an operating temperature of an engine 118 of the vehicle. Accordingly, the fan 114, the radiator, and the engine 118 take up a significant amount of the space in the under-hood environment 100. Advantageously, stacked gears and a position of a motor 120 of the steering system 102 enables the steering system 102 to be positioned within relatively small spaces in the under-hood environment 100 while still generating enough power to turn the wheels of heavy trucks. Specifically, the stacked gears provide a combined reduction of greater than 100:1 to generate ample force to turn the wheels.

In some examples, the position of the motor 120 of the steering system 102 is adaptable to the available space of the under-hood environment 100. For example, the motor 120 can be positioned anywhere within a 360° orbit of a worm gear of the steering system 102 given that a pinion of the motor 120 is engaged with an intermediate gear and a pinion of the intermediate gear is engaged with a helical spur gear that is fixed to the worm gear. Additionally, a size of the steering system 102 can be reduced to adapt to the under-hood environment 100.

Figure 2:
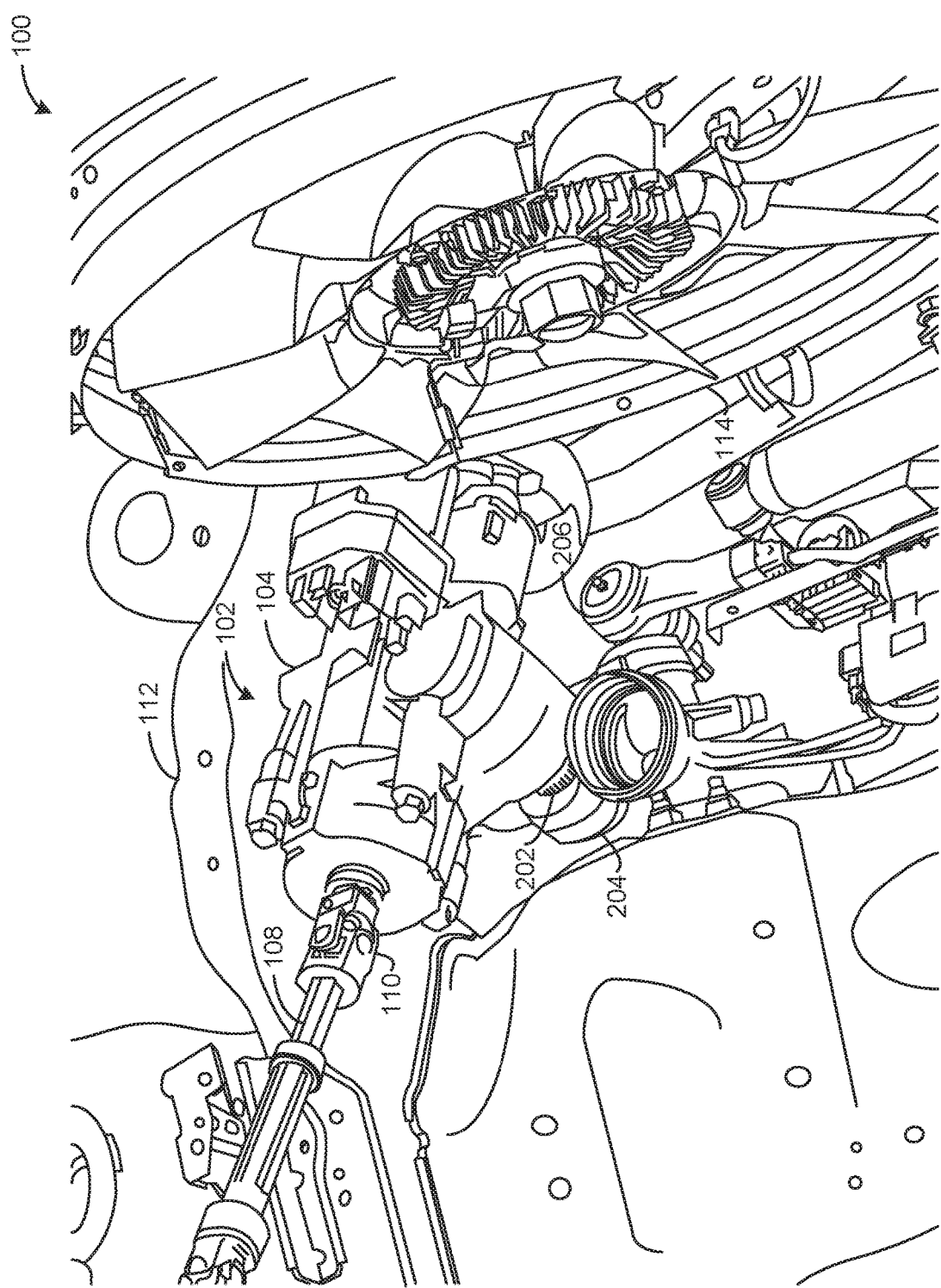
FIG. 2 illustrates a second view of the steering system in the under-hood environment of the vehicle of FIG. 1.

FIG. 2 illustrates a second view of the steering system 102 in the under-hood environment 100 of FIG. 1. In FIG. 2, the engine 118 of FIG. 1 is not shown to more clearly illustrate a splined shaft 202, a pitman arm 204, and a drag link 206 of the steering system 102. In FIG. 2, the splined shaft 202 extends from a sector gear within the housing 104. In FIG. 2, the splined shaft 202 protrudes from a bottom portion of the housing 104 to couple to the pitman arm 204. In some examples, an opening of the pitman arm 204 includes splines that mate with splines of the splined shaft 202. Further, the pitman arm 204 is coupled to the drag link 206, which is connected to a wheel of the vehicle.

In FIG. 2, the steering system 102 causes the splined shaft 202 to rotate in response to a rotation of the steering shaft 108. In turn, the splined shaft 202 moves (e.g., pivots) the pitman arm 204. Further, the pitman arm 204 converts the rotation of the splined shaft 202 into a linear movement of the drag link 206. In some examples, the drag link 206 is connected to a knuckle of a wheel of the vehicle. In some such examples, the linear movement of the drag link 206 adjusts an orientation of the knuckle to turn the wheels. As a result, the steering system 102 converts the rotation of the steering shaft 108 into a movement of the wheels to steer the vehicle.

In some examples, an ample amount of force must be generated to turn the wheels of heavier vehicles, such as trucks. As such, the steering system 102 provides a combined gear reduction of greater than 100:1 to generate the ample amount of force required to steer trucks while utilizing electrically powered steering.

Figure 3:
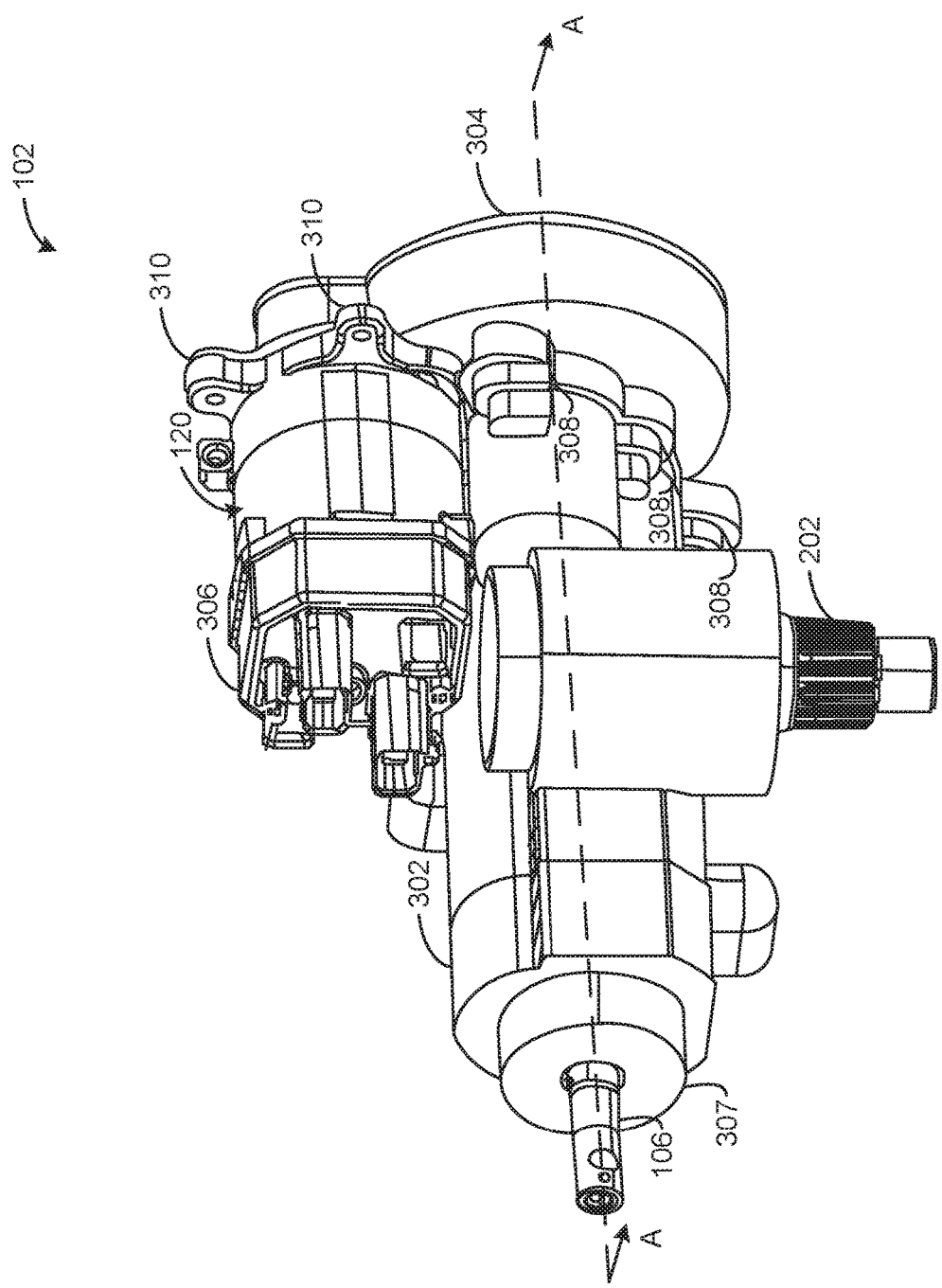
FIG. 3 illustrates the steering system of FIGS. 1 and 2.

FIG. 3 illustrates the steering actuator 102 of FIGS. 1 and 2. In FIG. 3, the steering actuator 102 includes a first housing 302, a second housing 304, a third housing 306, a torque sensor 307, and the motor 120. In FIG. 3, the motor 120 is disposed in the third housing 306. In FIG. 3, the input shaft 106, a worm gear, a ball nut, a helical spur gear, a sector gear, and the splined shaft 202 of the steering actuator 102 are disposed in the first housing 302. In FIG. 3, a pinion of the motor 120, an intermediate gear, and a pinion of the intermediate gear of the steering actuator 102 are disposed in the second housing 304.

In some examples, the splined shaft 202 protrudes from a bottom portion of the first housing 302. In some examples, the input shaft 106 protrudes from a front portion of the first housing 302. In FIG. 3, the torque sensor 307 surrounds a portion of the input shaft 106 that protrudes from the front portion of the first housing 302. In some examples, the torque sensor 307 measures an angular rotation of the input shaft 106 relative to the worm gear based on a magnetic field of a magnet mounted on the input shaft 106, as discussed further in association with FIG. 4.

In FIG. 3, the first housing 302 is coupled to the second housing 304 via first connections 308. Further, the second housing 304 is coupled to the third housing via second connections 310. For example, the first and second connections 308, 310 can include screws, bolts, nuts, etc., to couple the first housing 302 to the second housing 304 and the second housing 304 to the third housing 306.

Figure 4:
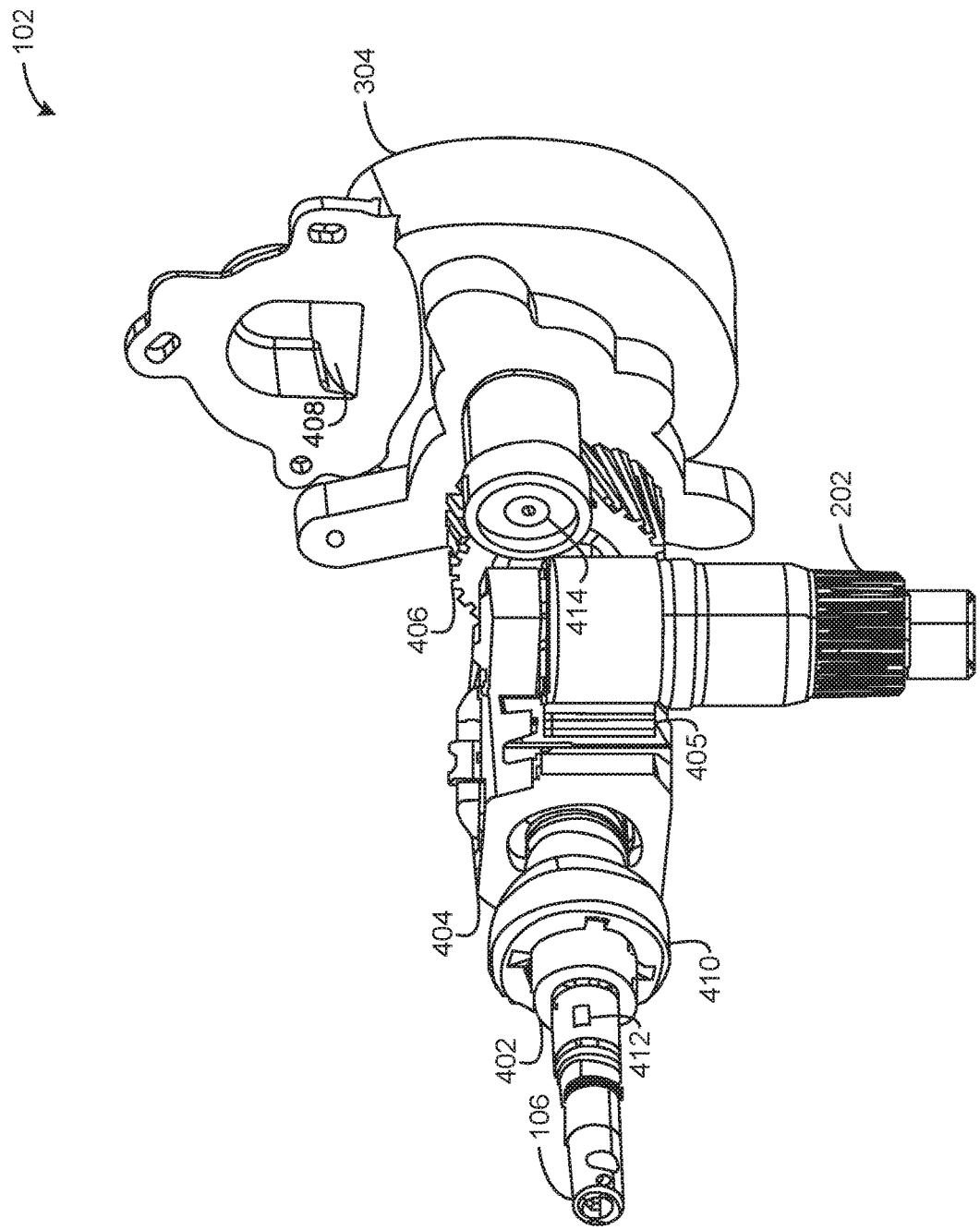
FIG. 4 illustrates the steering system of FIGS. 1, 2, and 3 with a portion of a housing removed.

FIG. 4 illustrates the steering system 102 of FIGS. 1, 2, and 3 with the first housing 302, the third housing 306, and the torque sensor 307 removed. In some examples, the steering system 102 includes the input shaft 106, the splined shaft 202, a worm gear 402, a ball nut 404, a sector gear 405, a helical spur gear 406, a magnet 412 mounted on the input shaft 106, and a first bearing (e.g., a bearing and an associated lock ring) 410 positioned within the first housing 302. In some examples, the steering system 102 further includes an intermediate gear 408 and a second bearing 414 positioned within the second housing 304. In FIG. 4, the motor 120 positioned within the third housing 306 and the pinion of the motor 120 positioned within the second housing 304 are not shown. Further, in FIG. 4, the pinion of the intermediate gear 408 is hidden by the second housing 304.

In FIG. 4, a portion of the input shaft 106 is positioned within the worm gear 402. In other examples, a portion of the worm gear 402 is positioned within the input shaft 106. In some examples, the portion of the input shaft 106 positioned within the worm gear 402 includes external gear teeth. In some such examples, the worm gear 402 includes internal gear teeth that mesh with the external gear teeth of the input shaft 106 to couple the worm gear 402 and the input shaft 106. Further, a first end of a torsion bar (not shown) is coupled to an interior of the input shaft 106 and a second end of the torsion bar is coupled to an interior of the worm gear 402, as discussed further in association with FIG. 8. As such, the input shaft 106 is also coupled to the worm gear 402 via the torsion bar. In some examples, the internal gear teeth of the worm gear 402 provide to a hard stop at a certain angular rotation of the input shaft 106 to limit a torque applied to the torsion bar. In some such examples, the input shaft 106 and the worm gear 402 rotate together when the hard stop is reached. As such, the hard stop maintains safe operation of the steering system 102 while allowing the torsion bar to hold enough torsion for precise and accurate measurements to be made by the torque sensor 307.

In some examples, the ball nut 404 surrounds a portion of the worm gear 402. In FIG. 4, the helical spur gear 406 is fixed to an end of the worm gear 402 opposite the input shaft 106. As such, the helical spur gear 406 and the worm gear 402 rotate together. In FIG. 4, the pinion of the intermediate gear 408 is engaged with the helical spur gear 406. In some examples, the pinion of the intermediate gear 408 is fixed to the intermediate gear 408 enabling the intermediate gear 408 and the pinion of the intermediate gear 408 to rotate together. In some examples, the intermediate gear 408 is engaged with the pinion of the motor 120.

In FIG. 4, the torque sensor 307 determines a torque applied by the input shaft 106 to the torsion bar based on an angular rotation of the magnet 412 mounted on the input shaft 106. In other examples, the input shaft 106 is magnetized in place of the magnet 412. Further, an output of the motor 120 is based on the torque applied by the input shaft 106 to the torsion bar and, thus, the angular rotation of the magnet 412. As such, the pinion of the motor 120 drives a rotation of the intermediate gear 408 and the pinion of the intermediate gear 408 based on the torque applied by the input shaft 106 to the torsion bar and/or the angular rotation of the magnet 412. As a result, the pinion of the intermediate gear 408 rotates the helical spur gear 406 and, thus, the worm gear 402. In FIG. 4, the ball nut 404 translates as the worm gear 402 rotates. For example, the ball nut 404 moves towards the helical spur gear 406 as the worm gear 402 rotates clockwise in the orientation of FIG. 4 and moves towards the input shaft 106 as the worm gear 402 rotates counterclockwise. In some examples, the sector gear 405 rotates as the ball nut 404 translates. As a result, the rotation of the sector gear 405 pivots the pitman arm 204 and moves the drag link 206 causing the wheels of the vehicle to pivot.

In FIG. 4, the second bearing 414 is disposed on a side of the pinion of the intermediate gear 408 opposite the intermediate gear 408 to provide support to the intermediate gear 408 and the pinion of the intermediate gear 408 within the second housing 304. In some examples, an additional bearing is disposed between the intermediate gear 408 and the pinion of the intermediate gear 408 to provide additional support within the second housing 304, as discussed further in association with FIG. 5. In FIG. 4, the first bearing 410 is disposed around the worm gear 402 to provide support to the worm gear 402 and, in turn, the ball nut 404 and the helical spur gear 406 within the first housing 302.

Figure 5:
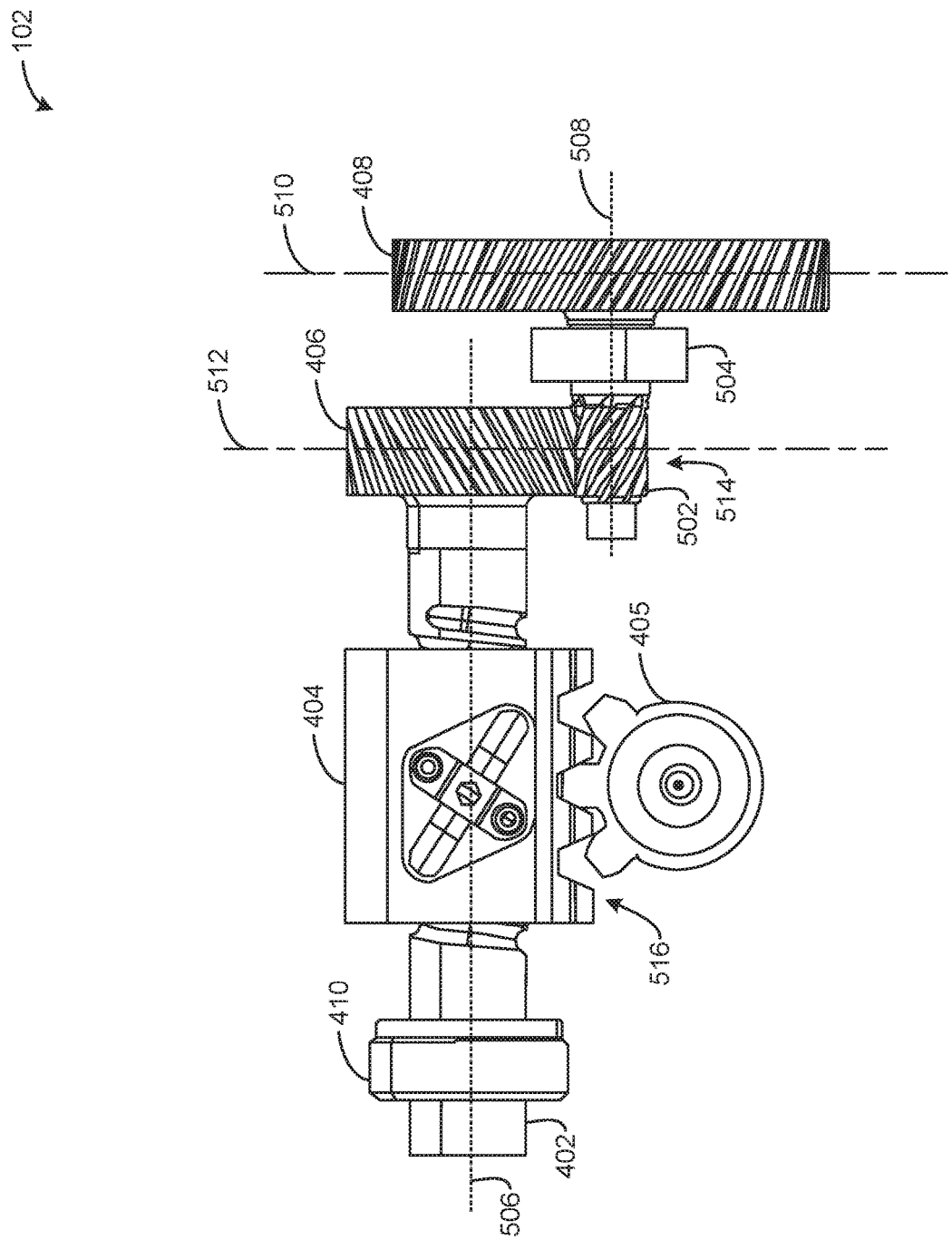
FIG. 5 illustrates a top-down view of a portion of the steering system of FIGS. 1, 2, 3, and 4.

FIG. 5 illustrates a portion of the steering system 102 of FIGS. 1, 2, 3, and 4. In FIG. 5, the steering system 102 includes a pinion 502 of the intermediate gear 408, a third bearing 504, a first axis of rotation 506, a second axis of rotation 508, a first plane 510, and a second plane 512. In FIG. 5, the steering system 102 further includes the worm gear 402, the ball nut 404, the helical spur gear 406, the intermediate gear 408, and the first bearing 410 of FIG. 4.

In FIG. 5, the worm gear 402 and the helical spur gear 406 are aligned along the first axis of rotation 506. In FIG. 5, the intermediate gear 408 and the pinion 502 of the intermediate gear 408 are aligned along the second axis of rotation 508. In some examples, the second axis of rotation 508 is parallel to the first axis of rotation 506. In some examples, the motor 120 and the pinion of the motor 120 are aligned along a third axis of rotation, as discussed further in association with FIG. 8. In some such examples, the third axis of rotation is parallel to the second axis of rotation 508. In some examples, a placement of the second axis of rotation 508 and the third axis of rotation is orbital relative to the first axis of rotation 506. In other words, the second axis of rotation 508 and the third axis of rotation can be positioned anywhere within a 360° orbit of the first axis of rotation 506 given that the pinion 502 of the intermediate gear 408 is engaged with the helical spur gear 406 and the pinion of the motor 120 is engaged with the intermediate gear 408.

Figure 7:
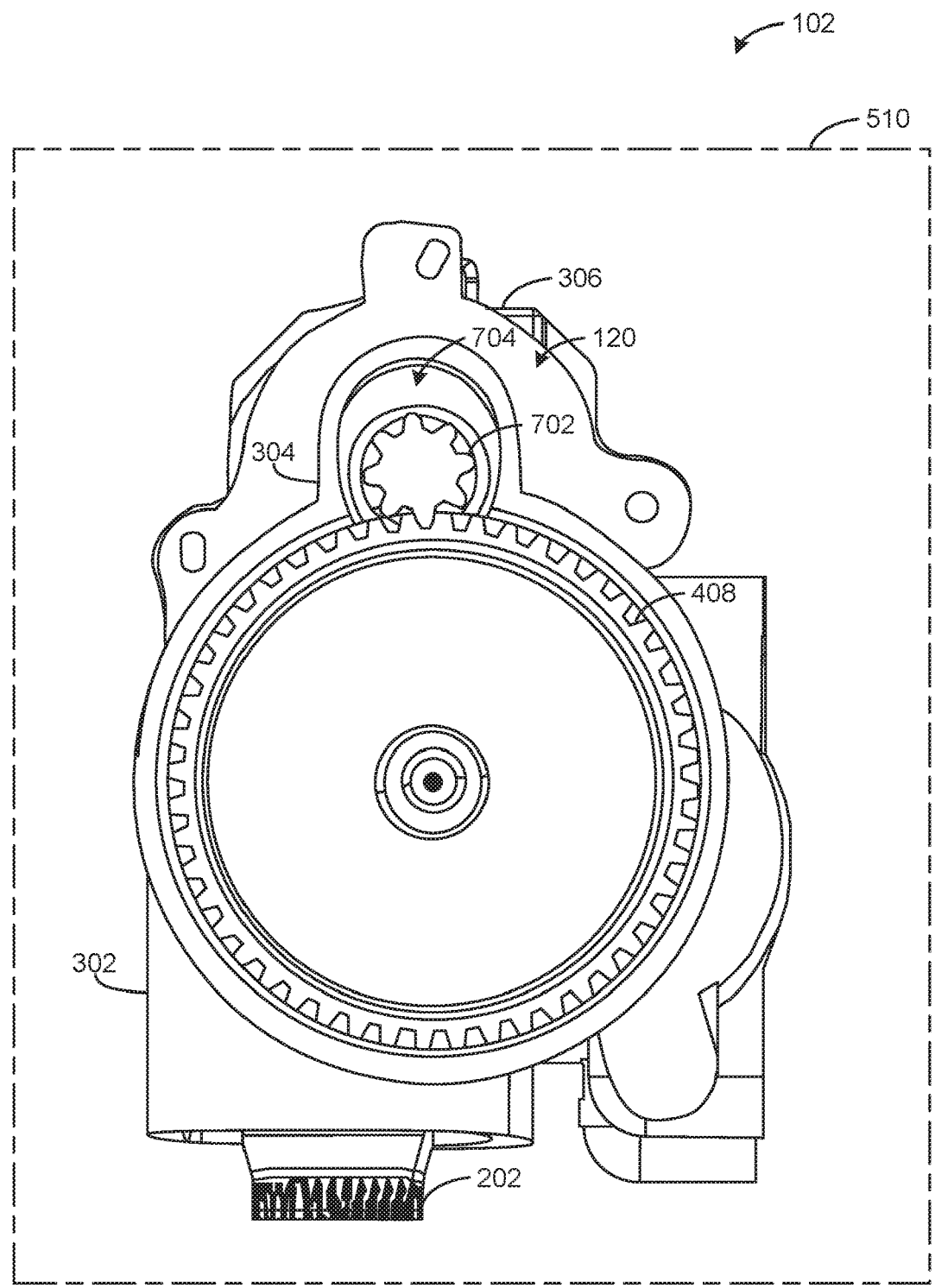
FIG. 7 illustrates a plane of a second gear set of the steering system of FIGS. 1, 2, and 3.

In some examples, a first gear set includes the pinion of the motor 120 engaged with the intermediate gear 408, as discussed further in association with FIG. 7. In some examples, the first gear set is aligned along the first plane 510. In some such examples, the first plane 510 does not intersect the worm gear 402. In FIG. 5, a second gear set 514 includes the pinion 502 of the intermediate gear 408 engaged with the helical spur gear 406. In some examples, the second gear set 514 is aligned along the second plane 512. Further, the first plane 510 and the second plane 512 are orthogonal to a rotational axis of the worm gear 402 and/or the helical spur gear 406 (e.g., the first axis of rotation 506). In FIG. 5, a third gear set 516 includes the ball nut 404 engaged with a portion of the worm gear 402.

In FIG. 5, the third bearing 504 is disposed between the pinion 502 of the intermediate gear 408 and the intermediate gear 408 to provide support to the intermediate gear 408 and the pinion 502 of the intermediate gear 408 within the second housing 304. As such, the third bearing 504 is disposed between the first gear set and the second gear set 514 and the second bearing 414 of FIG. 4 is disposed on an opposite side of the second gear set 514 from the third bearing 504.

Figure 6:
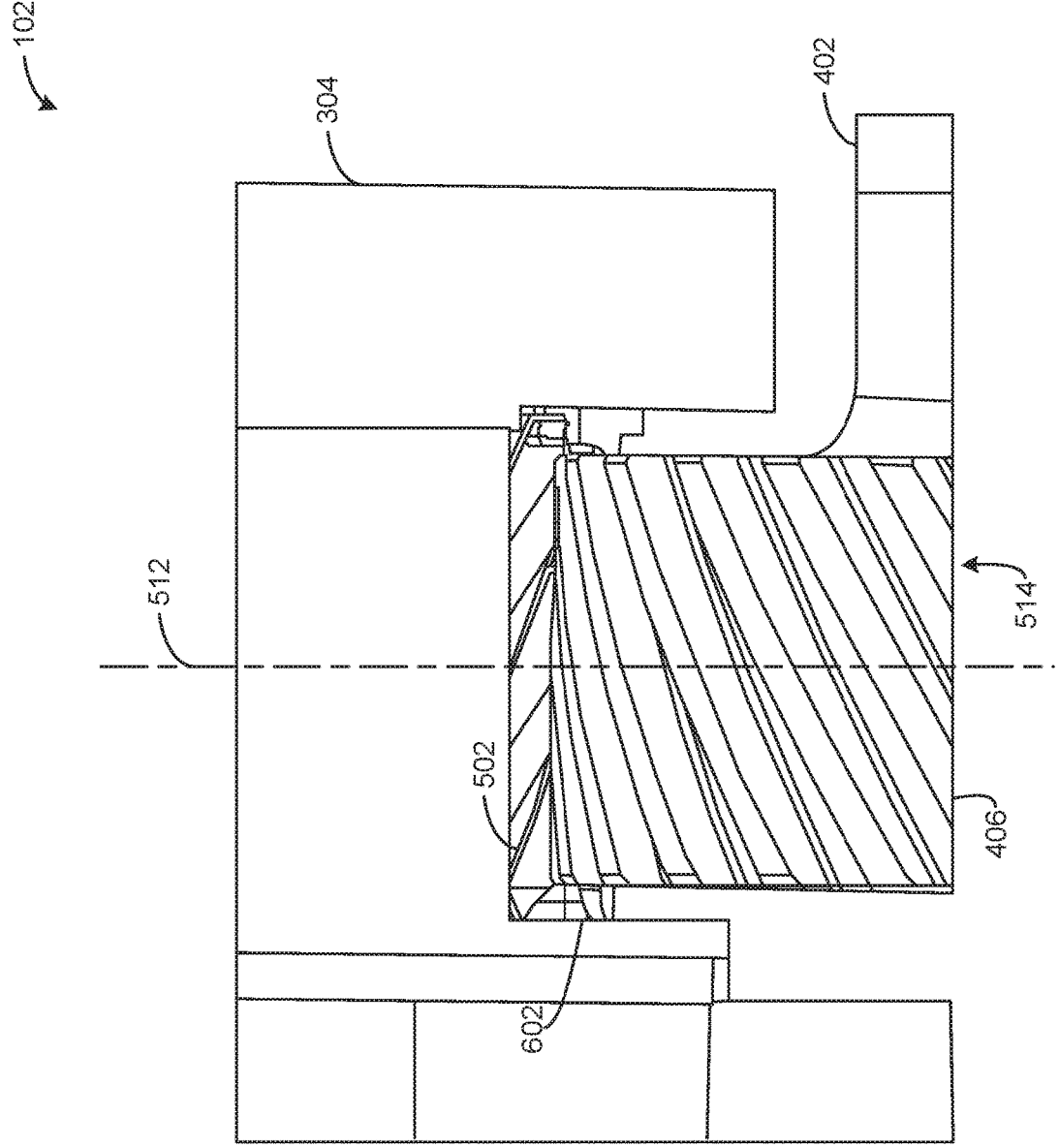
FIG. 6 illustrates a first gear set of the steering system of FIGS. 1, 2, 3, 4, and 5.

FIG. 6 illustrates the second gear set 514 aligned along the second plane 512 of the steering system 102 of FIGS. 1, 2, 3, 4, and 5. In FIG. 6, the second housing 304 includes an opening 602 in to allow the pinion 502 of the intermediate gear 408 to engage with the helical spur gear 406. As such, the opening 602 allows the second gear set 514 to be engaged through different housings (e.g., the first housing 302 and the second housing 304). In some examples, the pinion 502 of the intermediate gear 408 rotates the helical spur gear 406 and, thus, the worm gear 402 to translate the ball nut 404.

FIG. 7 illustrates a first gear set 704 aligned along the first plane 510 of the steering system 102 of FIGS. 1, 2, 3, 4, and 5. In FIG. 7, the steering system 102 includes a pinion 702 of the motor 120 engaged with the intermediate gear 408 within the first plane 510. In some examples, the first plane 510 is orthogonal to a rotational axis of the worm gear 402 (e.g., the first axis of rotation 506). In FIG. 7, the first plane 510 does not intersect the worm gear 402 or the helical spur gear 406.

In FIG. 7, the motor 120 is disposed in the third housing 306 while the pinion 702 of the motor 120 is positioned within the second housing 304 along with the intermediate gear 408 and the pinion 502 of the intermediate gear 408. In FIG. 7, a portion of the splined shaft 202 is disposed within the first housing 302 along with the worm gear 402, the ball nut 404, the sector gear 405, and the helical spur gear 406.

In FIG. 7, the motor 120 drives the pinion 702 of the motor 120 in response to an angular rotation of the input shaft 106 and/or a torque applied by the input shaft 106 to a torsion bar. In FIG. 7, the pinion 702 of the motor 120 rotates the intermediate gear 408 and, as a result, the pinion 502 of the intermediate gear 408. Further, the pinion 502 of the intermediate gear 408 rotates the helical spur gear 406 and, in turn, the worm gear 402 to translate the ball nut 404. As such, the translation of the ball nut 404 rotates the sector gear 405 and, in turn, the splined shaft 202 to turn the wheels of the vehicle.

Figure 8:
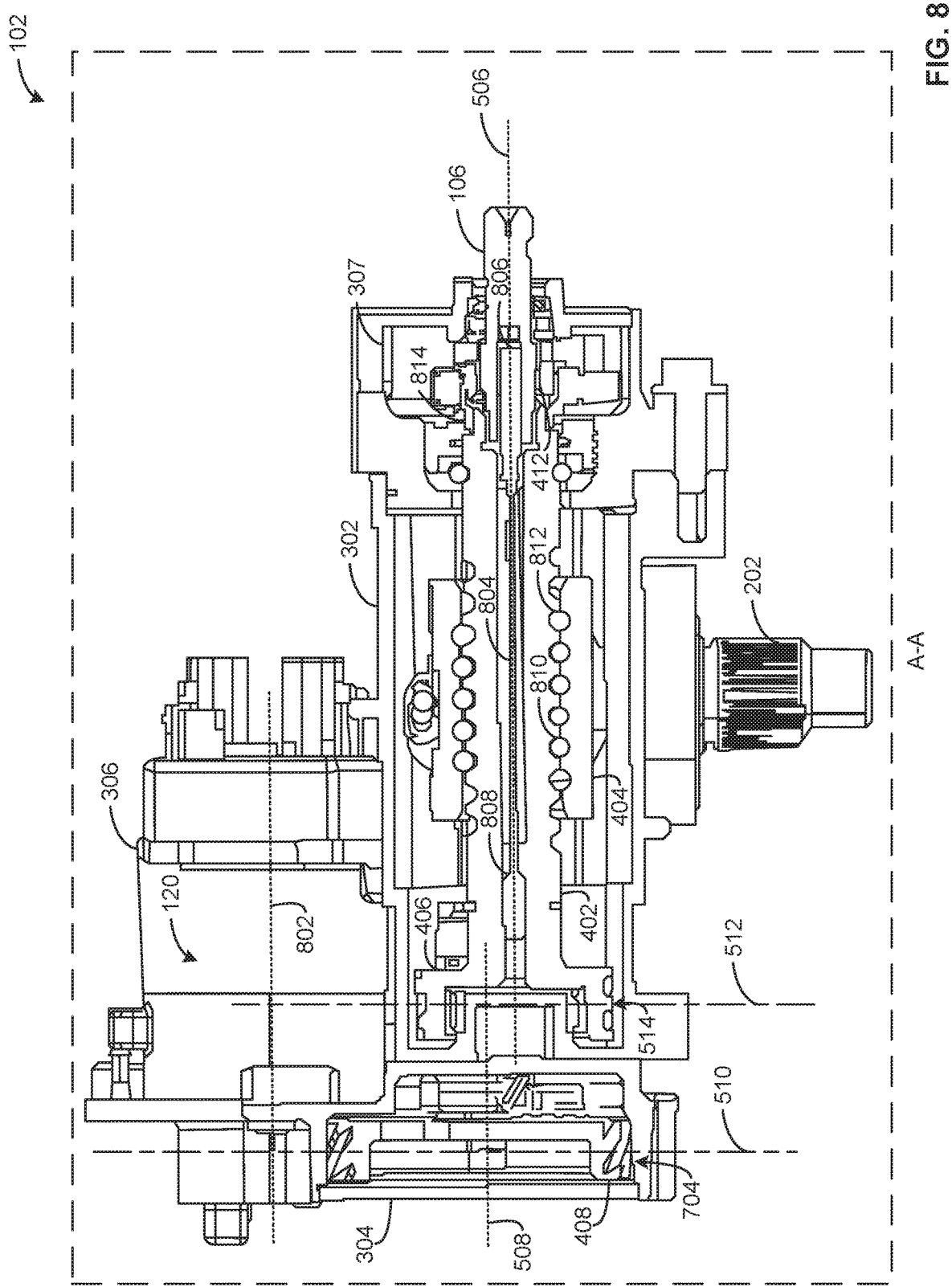
FIG. 8 illustrates an example cross-section of the steering system of FIG. 3.

FIG. 8 illustrates a cross-section A-A (FIG. 3) of the steering actuator 102 of FIG. 3. In FIG. 8, the steering actuator 102 includes a third axis of rotation 802, and a torsion bar 804 including a first end 806 and a second end 808. In FIG. 8, the steering actuator 102 further includes the input shaft 106, the magnet 412, the worm gear 402, the ball nut 404, the helical spur gear 406, the intermediate gear 408, the torque sensor 307, the first axis of rotation 506, the second axis of rotation 508, the first plane 510, and the second plane 512. In FIG. 8, the ball nut 404 includes ball bearings 810 and ball guides 812. In FIG. 8, the motor 120 is positioned within the third housing 306 and the pinion 702 of the motor 120 is positioned within the second housing 304. In FIG. 8, the pinion 502 of the intermediate gear 408 is positioned behind the helical spur gear 406 within the second housing 304.

In FIG. 8, the motor 120, and the pinion 702 of the motor 120 are aligned along the third axis of rotation 802. In FIG. 8, the placement of the second axis of rotation 508 and the third axis of rotation 802 is orbital relative to the first axis of rotation 506. In other words, positions of the motor 120 and the pinion 702 of the motor 120, and the intermediate gear 408 and the pinion 502 of the intermediate gear 408 can be placed anywhere within a 360° orbit around the worm gear 402 and/or the helical spur gear 406.

In FIG. 8, the first end 806 of the torsion bar 804 is coupled to an interior of the input shaft 106. In FIG. 8, the second end 808 of the torsion bar 804 is coupled to an interior of the worm gear 402. In FIG. 8, the torque sensor 307 measures an angular rotation of the magnet 412 mounted on the input shaft 106. For example, a Hall effect sensor within the torque sensor 307 can measure a magnetic field and/or a change in the magnetic field of the magnet 412, which alters as the magnet 412 rotates. In some other examples, the torque sensor 307 measures an angular rotation of the first end 806 of the torsion bar 804 relative to the second end 808 of the torsion bar 804. In some such examples, the Hall effect sensor measures a magnetic field of the torsion bar 804 that alters as the first or second end 806, 808 of the torsion bar 804 rotates. In some examples, the torque sensor 307 utilizes the Vernier algorithm to determine the angular rotation of the input shaft 106 based on the magnetic field of the magnet 412 and/or the torsion bar 804. Further, the torque sensor 307 converts the determined angular rotation to a torque applied by the input shaft 106 to the torsion bar 804.

In some examples, an output of the motor 120 is based on the torque applied by the input shaft 106 to the torsion bar 804 and/or the angular rotation the magnet 412. In some examples, a gear 814 of the torque sensor 307 rotates with the worm gear 402 allowing the torque sensor 307 to provide an indication to the motor 120 when a target rotation is reached. For example, the torque applied by the input shaft 106 to the torsion bar 804 and/or an angular rotation of the magnet 412 determined by the torque sensor 307 can correspond to a target angular rotation of the worm gear 402. As a result, the motor 120 rotates the worm gear 402 and, in turn, the gear 814 of the torque sensor 307 via the first and second gear sets 704, 514. Further, the torque sensor 307 can compare the rotation of the gear 814 to the target angular rotation of the worm gear 402 to determine when the target rotation is reached.

As illustrated in FIG. 8, the first gear set 704, including the pinion 702 of the motor 120 and the intermediate gear 408, is aligned along the first plane 510, which does not intersect the worm gear 402 and/or the helical spur gear 406. In FIG. 8, the motor 120 within the third housing 306 drives the pinion 702 of the motor 120 to rotate the intermediate gear 408. In FIG. 8, the pinion 502 of the intermediate gear 408 rotates with the intermediate gear 408. Further, the pinion 502 of the intermediate gear 408 rotates the helical spur gear 406.

In other examples, the pinion 502 of the intermediate gear 408 can be positioned within the helical spur gear 406. In some such examples, the helical spur gear 406 is implemented as a ring gear including gear teeth on an interior thereof to engage with the pinion 502 of the intermediate gear 408. As a result, the pinion 502 of the intermediate gear 408 rotates the helical spur gear (e.g., the ring gear) 406 to rotate the worm gear 402.

In FIG. 8, the worm gear 402 rotates causing the ball bearings 810 to move through the ball guides 812, which translates the ball nut 404. In FIG. 8, the sector gear 405 rotates as the ball nut 404 translates. As a result, the splined shaft 202 rotates with the sector gear 405 to turn the wheels of the vehicle.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that provide a rotary assist apparatus for RCB steering gears. As such, the RCB steering gears are able to generate steering power that is sufficient for heavier vehicles, such as trucks, while using an electrical power steering. Further, the rotary assist apparatus provides a versatile layout that is advantageous for implementation within different under-hood environments. Specifically, a placement of the second axis of rotation 508, which the intermediate gear 408 and the pinion 502 of the intermediate gear 408 are aligned along, and the third axis of rotation 802, which the motor 120 and the pinion 702 of the motor 120 are aligned along, is orbital to the first axis of rotation 506, which worm gear 402 and the helical spur gear 406 are aligned along.

Example rotary assist apparatus for recirculating ball steering gears are disclosed herein. Further examples and combinations thereof include the following:

Example 1 includes a motor vehicle steering system comprising an input shaft to couple to a steering shaft of a motor vehicle, a worm gear, a first end of the worm gear coupled to the input shaft, a second end of the worm gear fixed to a helical spur gear, a ball nut surrounding a portion of the worm gear, the ball nut including ball bearings and ball guides, an intermediate gear fixed to a first pinion, the first pinion engaged with the helical spur gear, a motor fixed to a second pinion, the second pinion engaged with the intermediate gear, the motor to rotate the worm gear to translate the ball nut, and a sector gear engaged with the ball nut, the sector gear to rotate as the ball nut translates.

Example 2 includes the motor vehicle steering system of example 1, wherein the second pinion rotates the intermediate gear and the first pinion, and the first pinion rotates the helical spur gear to rotate the worm gear and translate the ball nut.

Example 3 includes the motor vehicle steering system of example 2, further including a pitman arm coupled to the sector gear, the pitman arm to couple to a drag link to turn wheels of a motor vehicle as the sector gear rotates.

Example 4 includes the motor vehicle steering system of example 1, wherein an engagement between the second pinion and the intermediate gear provides a first gear reduction and an engagement between the first pinion and the helical spur gear provides a second gear reduction.

Example 5 includes the motor vehicle steering system of example 4, wherein the first gear reduction and the second gear reduction provide a combined reduction of greater than 100 example 1 includes example 6 includes the motor vehicle steering system of example 1, further including a torsion bar, wherein a first end of the torsion bar is coupled to the input shaft and a second end of the torsion bar is coupled to the worm gear.

Example 7 includes the motor vehicle steering system of example 1, further including a torque sensor to measure an angular rotation of the input shaft relative to the worm gear.

Example 8 includes the motor vehicle steering system of example 7, wherein an output of the motor is based on the angular rotation of the input shaft relative to the worm gear.

Example 9 includes a steering actuator comprising a worm gear fixed to a helical spur gear, a first gear set including a pinion of a motor engaged with an intermediate gear, a second gear set including a pinion of the intermediate gear engaged with the helical spur gear, and a third gear set including a ball nut engaged with a portion of the worm gear, the ball nut to translate as the worm gear rotates.

Example 10 includes the steering actuator of example 9, further including a torsion bar, wherein a first end of the torsion bar is coupled to an interior of the worm gear and a second end of the torsion bar is coupled to an interior of an input shaft.

Example 11 includes the steering actuator of example 10, further including a torque sensor to determine a torque applied by the input shaft to the torsion bar based on an angular rotation of the torsion bar.

Example 12 includes the steering actuator of example 11, wherein an output of the motor is based on the torque.

Example 13 includes the steering actuator of example 9, wherein the first gear set is aligned along a first plane and the second gear set is aligned along a second plane, the first plane and the second plane orthogonal to an axis of rotation of the worm gear.

Example 14 includes the steering actuator of example 13, wherein the first plane does not intersect the worm gear.

Example 15 includes the steering actuator of example 9, further including a first bearing disposed between the first gear set and the second gear set and a second bearing disposed on an opposite side of the second gear set relative to the first bearing.

Example 16 includes the steering actuator of example 9, further including a sector gear engaged with the ball nut, the sector gear to rotate as the ball nut translates.

Example 17 includes the steering actuator of example 16, further including a first housing, the worm gear, the ball nut, the helical spur gear, and the sector gear disposed in the first housing, and a second housing, the pinion of the motor, the intermediate gear, and the pinion of the intermediate gear disposed in the second housing.

Example 18 includes a steering apparatus comprising a worm gear fixed to a helical spur gear, the worm gear and the helical spur gear aligned along a first axis of rotation, an intermediate gear fixed to a first pinion, the intermediate gear and the first pinion aligned along a second axis of rotation parallel to the first axis of rotation, the first pinion engaged with the helical spur gear, and a motor fixed to a second pinion, the motor and the second pinion aligned along a third axis of rotation parallel to the second axis of rotation, the second pinion engaged with the intermediate gear.

Example 19 includes the steering apparatus of example 18, wherein a placement of the second axis of rotation and the third axis of rotation is orbital relative to the first axis of rotation.

Example 20 includes the steering apparatus of example 18, further including a steering shaft coupled to the worm gear.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle steering system comprising:
   an input shaft to couple to a steering shaft of a vehicle;
   a worm gear, a first end of the worm gear coupled to the input shaft, a second end of the worm gear fixed to a spur gear;
   a ball nut surrounding a portion of the worm gear, the ball nut including ball bearings and ball guides;
   an intermediate gear fixed to a first pinion, the intermediate gear and the first pinion aligned along a first rotational axis, the first pinion engaged with the spur gear along a first plane that is transverse to a second rotational axis of the worm gear;
   a motor fixed to a second pinion, the second pinion engaged with the intermediate gear, the second pinion and the intermediate gear aligned along a second plane that is transverse to the second rotational axis of the worm gear, the first plane positioned between the second plane and the ball nut, the motor to rotate the worm gear to translate the ball nut; and
   a sector gear engaged with the ball nut, the sector gear to rotate as the ball nut translates.

2. The vehicle steering system of claim 1, wherein the second pinion rotates the intermediate gear and the first pinion, and the first pinion rotates the spur gear to rotate the worm gear and translate the ball nut.

3. The vehicle steering system of claim 2, further including a pitman arm coupled to the sector gear, the pitman arm to couple to a drag link to turn wheels of the vehicle as the sector gear rotates.

4. The vehicle steering system of claim 1, wherein an engagement between the second pinion and the intermediate gear provides a first gear reduction and an engagement between the first pinion and the spur gear provides a second gear reduction.

5. The vehicle steering system of claim 4, wherein the first gear reduction and the second gear reduction provide a combined reduction of greater than 100:1.

6. The vehicle steering system of claim 1, further including a torsion bar, wherein a first end of the torsion bar is coupled to the input shaft and a second end of the torsion bar is coupled to the worm gear.

7. The vehicle steering system of claim 1, further including a torque sensor to measure an angular rotation of the input shaft relative to the worm gear.

8. The vehicle steering system of claim 7, wherein an output of the motor is based on the angular rotation of the input shaft relative to the worm gear.

9. The vehicle steering system of claim 1, wherein the second rotational axis is parallel to the first rotational axis, and wherein the motor and the second pinion are aligned along a third rotational axis parallel to the second rotational axis.

10. A steering actuator comprising:
    a worm gear fixed to a spur gear;
    a first gear set including a pinion of a motor engaged with an intermediate gear;

a second gear set including a pinion of the intermediate gear engaged with the spur gear;
a third gear set including a ball nut engaged with a portion of the worm gear, the ball nut to translate as the worm gear rotates;
a first bearing disposed between the first gear set and the second gear set; and
a second bearing disposed on an opposite side of the second gear set relative to the first bearing.

11. The steering actuator of claim 10, further including a torsion bar, wherein a first end of the torsion bar is coupled to an interior of the worm gear and a second end of the torsion bar is coupled to an interior of an input shaft.

12. The steering actuator of claim 11, further including a torque sensor to determine a torque applied by the input shaft to the torsion bar based on an angular rotation of the torsion bar.

13. The steering actuator of claim 12, wherein an output of the motor is based on the torque.

14. The steering actuator of claim 10, wherein the first gear set is aligned along a first plane and the second gear set is aligned along a second plane, the first plane and the second plane orthogonal to an axis of rotation of the worm gear.

15. The steering actuator of claim 14, wherein the first plane does not intersect the worm gear.

16. The steering actuator of claim 10, further including a sector gear engaged with the ball nut, the sector gear to rotate as the ball nut translates.

17. The steering actuator of claim 16, further including:
a first housing, the worm gear, the ball nut, the spur gear, and the sector gear disposed in the first housing; and
a second housing, the pinion of the motor, the intermediate gear, and the pinion of the intermediate gear disposed in the second housing.

18. A steering apparatus comprising:
a worm gear in contact with a spur gear, the worm gear and the spur gear aligned along a first axis of rotation;
an intermediate gear fixed to a first pinion, the intermediate gear and the first pinion aligned along a second axis of rotation parallel to the first axis of rotation, the first pinion engaged with the spur gear; and
a motor fixed to a second pinion, the motor and the second pinion aligned along a third axis of rotation parallel to the second axis of rotation, the second pinion engaged with the intermediate gear, the second pinion and the intermediate gear aligned along a plane that is transverse to rotational axes of the second pinion and the intermediate gear, and wherein the plane does not intersect the worm gear.

19. The steering apparatus of claim 18, wherein a placement of the second axis of rotation and the third axis of rotation is orbital relative to the first axis of rotation.

20. The steering apparatus of claim 18, further including a steering shaft coupled to the worm gear.

* * * * *